(12) United States Patent
Jo

(10) Patent No.: US 11,614,535 B2
(45) Date of Patent: Mar. 28, 2023

(54) RADAR APPARATUS FOR VEHICLE AND METHOD FOR CONTROLLING THE SAME

(71) Applicant: HL KLEMOVE CORP., Incheon (KR)

(72) Inventor: Kyung Tae Jo, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 138 days.

(21) Appl. No.: 16/593,955

(22) Filed: Oct. 4, 2019

(65) Prior Publication Data

US 2020/0116855 A1 Apr. 16, 2020

(30) Foreign Application Priority Data

Oct. 10, 2018 (KR) .................. 10-2018-0120229

(51) Int. Cl.
| | |
|---|---|
| *G01S 13/931* | (2020.01) |
| *G01S 7/41* | (2006.01) |
| *G01S 7/35* | (2006.01) |
| *G01S 13/36* | (2006.01) |

(52) U.S. Cl.
CPC ............ *G01S 13/931* (2013.01); *G01S 7/352* (2013.01); *G01S 7/412* (2013.01); *G01S 7/356* (2021.05); *G01S 13/36* (2013.01)

(58) Field of Classification Search
CPC ........ G01S 13/931; G01S 7/352; G01S 7/412; G01S 7/356; G01S 13/36
See application file for complete search history.

(56) References Cited

U.S. PATENT DOCUMENTS

| | | | | |
|---|---|---|---|---|
| 2002/0067287 A1* | 6/2002 | Delcheccolo | ...... | H01Q 21/0075 340/901 |
| 2005/0021201 A1* | 1/2005 | Klotz | ................. | B60W 30/16 702/189 |

FOREIGN PATENT DOCUMENTS

| | | | |
|---|---|---|---|
| EP | 3 021 134 | 5/2016 | |
| KR | 10-2014-0123435 | 10/2014 | |
| KR | 20140123435 A * | 10/2014 | ......... G06Q 30/0601 |
| KR | 10-2017-0083115 | 7/2017 | |

OTHER PUBLICATIONS

Office Action dated Sep. 28, 2022 for Korean Patent Application No. 10-2018-0120229 and its English translation from Global Dossier.

* cited by examiner

*Primary Examiner* — Peter M Bythrow
*Assistant Examiner* — Nazra Nur Waheed
(74) *Attorney, Agent, or Firm* — Ladas & Parry, LLP

(57) ABSTRACT

A radar apparatus for a vehicle includes radar sensors, and a controller configured to generate information on the object based on a radar signal reflected by the object entering the fields of sensing of the radar sensors, wherein the controller, when the object is duplicately detected by two or more of the radar sensors, integrates two or more pieces of information on the objects detected by the two or more radar sensors, respectively, into one, and when the object moves from a field of sensing of a first radar sensor to a field of sensing of a second radar sensor, performs control to hand over the information on the object between the first radar sensor and the second radar sensor. Accordingly, information on an object detected by a radar sensor can be efficiently processed and an object moving through fields of sensing of radar sensors can be continuously detected.

20 Claims, 10 Drawing Sheets

RADAR APPARATUS FOR VEHICLE AND METHOD FOR CONTROLLING THE SAME

CROSS REFERENCE TO RELATED APPLICATION

This application claims priority from Korean Patent Application No. 10-2018-0120229, filed on Oct. 10, 2018, which is hereby incorporated by reference for all purposes as if fully set forth herein.

BACKGROUND OF THE INVENTION

1. Field of the Invention

The present disclosure relates to a radar apparatus for a vehicle, which senses an object using a plurality of radar sensors provided in a vehicle, and further relates to a method for controlling the same.

2. Description of the Prior Art

Recently, various devices for assisting a driver in driving a vehicle or for autonomous driving have been commercialized or developed. With this trend, radar provided in a vehicle is used for sensing objects around the vehicle and providing information, thereby assisting in the driving of the vehicle.

Conventional radar systems perform design and operation of vehicle control logic using only information in a field of sensing of each radar sensor. Since the conventional radar system needs to compensate for/correct the performance of radar using limited information in the field of sensing, there is a high possibility of detection errors, and detection performance may vary depending on the angle of a radiated beam.

Therefore, as the employment of a radar system is popularized/required as an auxiliary device for the development of an autonomous system, a vehicle tends to be equipped with a plurality of radar systems in order to improve the functions thereof. Accordingly, there is growing need for a method for sharing information between a plurality of radar systems mounted to the vehicles and for detecting objects using the same.

SUMMARY OF THE INVENTION

In view of the above-mentioned background, an aspect of the present disclosure is to provide a radar apparatus for a vehicle, which integrates multiple pieces of information on an object duplicately detected by a plurality of radar sensors provided in the vehicle and processes the same, thereby efficiently processing data when acquiring information on the detected objects, and to further provide a control method thereof.

Another aspect of the present disclosure is to provide a radar apparatus for a vehicle, which hands over information on an object between radar sensors with respect to the object moving between fields of sensing of a plurality of radar sensors provided in the vehicle, thereby seamlessly and continuously detecting the same object to obtain information thereon, and to further provide a control method thereof.

In accordance with an aspect, the present disclosure provides a radar apparatus for a vehicle, which includes: a plurality of radar sensors configured to be disposed in the vehicle so as to have a predetermined field of sensing of the exterior of the vehicle, and configured to capture sensing data; at least one processor configured to process the sensing data captured by the plurality of radar sensors; and a controller, responsive at least in part to the processing of the sensing data and configured to generate information on the object based on a radar signal reflected by the object entering the fields of sensing of the plurality of radar sensors, wherein the controller is configured to: when the object is duplicately detected by two or more of the plurality of radar sensors, integrate two or more pieces of information on the objects detected by the two or more radar sensors, respectively, into one; and when the object moves from a field of sensing of a first radar sensor to a field of sensing of a second radar sensor, among the plurality of radar sensors, perform control so as to hand over the information on the object between the first radar sensor and the second radar sensor.

According to another aspect, the present disclosure provides a radar apparatus for a vehicle, which includes: a plurality of radar sensors configured to be disposed in the vehicle so as to have a predetermined field of sensing of the exterior of the vehicle, and configured to capture sensing data; and a domain control unit configured to process the sensing data captured by the plurality of radar sensors, and configured to control at least one driver assistance system provided in the vehicle, wherein the domain control unit, responsive at least in part to the processing of the sensing data, is configured to: when the object is duplicately detected by two or more of the plurality of radar sensors, integrate two or more pieces of information on the objects detected by the two or more radar sensors, respectively, into one; and when the object moves from a field of sensing of a first radar sensor to a field of sensing of a second radar sensor, among the plurality of radar sensors, perform control so as to hand over the information on the object between the first radar sensor and the second radar sensor.

According to another aspect, the present disclosure provides a method of controlling a radar apparatus for a vehicle equipped with a plurality of radar sensors, each having a predetermined field of sensing, the method including: generating information on an object based on a radar signal reflected by the object entering the fields of sensing of the plurality of radar sensors; when the object is duplicately detected by two or more of the plurality of radar sensors, integrating two or more pieces of information on the objects detected by the two or more radar sensors, respectively, into one; and when the object moves from a field of sensing of a first radar sensor to a field of sensing of a second radar sensor, among the plurality of radar sensors, performing control so as to hand over the information on the object between the first radar sensor and the second radar sensor.

As described above, according to the present disclosure, it is possible to provide a radar apparatus for a vehicle, which integrates multiple pieces of information on objects detected duplicately by a plurality of radar sensors provided in the vehicle and processes the same, thereby efficiently processing data when acquiring information on the detected objects, and to further provide a control method thereof.

In addition, according to the present disclosure, it is possible to provide a radar apparatus for a vehicle, which hands over information on an object between radar sensors with respect to an object moving between fields of sensing of a plurality of radar sensors provided in the vehicle, thereby seamlessly and continuously detecting the same object and obtaining information thereon, and to further provide a control method thereof.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
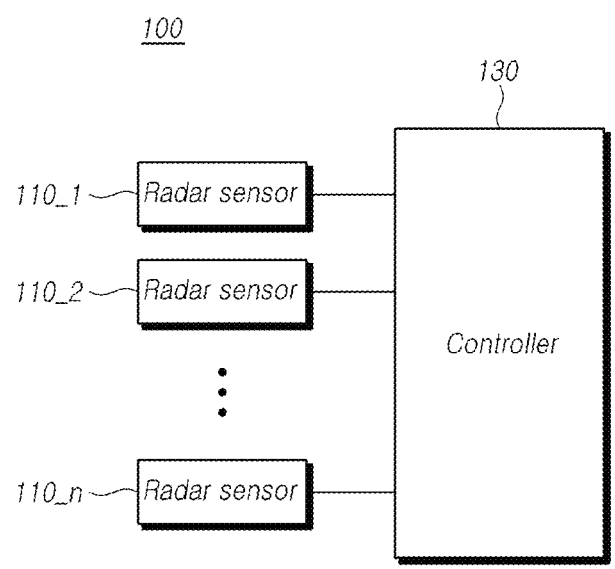
FIG. 1 is a block diagram of a radar apparatus for a vehicle according to the present disclosure.

Hereinafter, embodiments of the present disclosure will be described in detail with reference to the accompanying drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Unless defined otherwise, all terms as used herein (including technical terms and scientific terms) have the same meaning as commonly understood by a person of ordinary skill in the art to which the present disclosure pertains. Such terms as those defined in a generally used dictionary are not to be interpreted to have ideal or excessively meanings unless clearly defined in the present disclosure. The terms as described below are defined in consideration of the functions of the present disclosure, but the meaning of the terms may be changed according to a user, intention of an operator, or convention. Therefore, the definitions of the terms should be made based on the contents throughout the specification.

In the present disclosure, the term "field of sensing" refers to an area in which an object is sensed by each radar sensor provided in a vehicle, thereby obtaining information on the object. The term "duplicate detection" means that an object is detected in an area in which fields of sensing of two or more radar sensors overlap each other. In addition, the term "first radar sensor" means a radar sensor corresponding to the field of sensing where an object is detected before the object moves to another field of sensing, and the term "second radar sensor" means a radar sensor corresponding to another field of sensing, to which the object has moved. Further, the term "handover" means a method in which, when an object moves from one field of sensing to another field of sensing, a radar sensor of the field of sensing after the movement uses information on the object, which has been detected by a radar sensor of the field of sensing before movement, for detection of the object, thereby ensuring continuity in the detection of the object.

Hereinafter, a radar apparatus for a vehicle and a control method thereof according to embodiments of the present disclosure will be described with reference to the accompanying drawings.

FIG. 1 is a block diagram of a radar apparatus for a vehicle according to the present disclosure.

Referring to FIG. 1, a radar apparatus 100 for a vehicle according to the present disclosure includes: a plurality of radar sensors 110 disposed in a vehicle so as to have a predetermined field of sensing of the exterior of the vehicle, and configured to capture sensing data; at least one processor configured to process sensing data captured by the radar sensor; and a controller 130, responsive at least in part to the processing of the sensing data, configured to generate information on an object based on a radar signal reflected by the object entering the fields of sensing of the plurality of radar sensors.

The radar sensor 110 may transmit a radar signal, may detect the transmitted radar signal reflected by an object, and may provide information, such as a distance to the object around the vehicle, in frame units. The radar sensor 110 may include a transmission antenna for transmitting a radar signal and a reception antenna for detecting a reflected radar signal.

The radar sensor or radar system used in the present disclosure may include one or more radar sensors, such as a front radar sensor mounted on the front of the vehicle, a rear radar sensor mounted on the rear of the vehicle, and a side or a side & rear radar sensor mounted on each side of the vehicle. The radar sensor or radar system may analyze transmission and reception signals to process data, thereby detecting information on the object, and may include an electronic control unit (ECU) or a processor for the same. Data transmission from the radar sensor to the ECU or signal communication therebetween may be performed using an appropriate communication link such as a vehicle network bus or the like.

The radar sensor may include one or more transmission antennas for transmitting radar signals and one or more reception antennas for receiving signals reflected by objects.

Meanwhile, the radar sensor according to the present embodiment may employ a multi-dimensional antenna array and a multiple-input multiple-output (MIMO) signal transmission/reception scheme in order to form a virtual antenna aperture greater than an actual antenna aperture.

For example, a two-dimensional antenna array is used to attain horizontal and vertical angular precision and resolution. Using the two-dimensional radar antenna array, signals may be transmitted and received by two individual horizontal and vertical scans (multiplexed in time), and MIMO may be used separately from the two-dimensional horizontal and vertical radar scans (time-multiplexing).

More specifically, the radar sensor according to the present embodiment may employ a two-dimensional antenna array configuration including a transmission antenna portion including a total of twelve transmission antennas (Tx) and a reception antenna portion including sixteen reception antennas (Rx), and as a result, may have a total of 192 virtual reception antenna arrangements.

In this case, the transmission antenna portion may have three transmission antenna groups, each including four transmission antennas, wherein the first transmission antenna group may be spaced a predetermined distance apart from the second transmission antenna group in the vertical direction and the first or second transmission antenna group may be spaced a predetermined distance (D) apart from the third transmission antenna group in the horizontal direction.

In addition, the reception antenna portion may include four reception antenna groups, each including four reception antennas, wherein the respective reception antenna groups may be arranged to be spaced apart from each other in the vertical direction, and the reception antenna portion may be disposed between the first transmission antenna group and the third transmission antenna group, which are spaced apart from each other in the horizontal direction.

In another embodiment, the antennas of the radar sensors may be arranged in a two-dimensional antenna array. For example, each antenna patch may have a rhombus lattice arrangement, thereby reducing unnecessary side lobes.

Alternatively, the two-dimensional antenna array may include a V-shaped antenna array in which a plurality of radiation patches are arranged in a V shape, and, more specifically, may include two V-shaped antenna arrays. In this case, a single feed is provided to the apex of each V-shaped antenna array.

Alternatively, the two-dimensional antenna array may include an X-shaped antenna array in which a plurality of radiation patches are arranged in an X shape, and, more specifically, may include two X-shaped antenna arrays. In this case, a single feed is provided to the center of each X-shaped antenna array.

In addition, the radar sensor according to the present embodiment may use a MIMO antenna system in order to realize detection accuracy or resolution in the vertical and horizontal directions.

More specifically, respective transmission antennas in a MIMO system may transmit signals having independent and distinct waveforms. That is, each transmission antenna may transmit a signal in an independent waveform different from those of other transmission antennas, and respective reception antennas may identify the transmission antenna that has transmitted the signal reflected by the object because the signals have different waveforms.

In addition, the radar sensor according to the present embodiment may be configured to include a radar housing that accommodates a substrate and a circuit including the transmission/reception antenna, and a radome that constitutes the appearance of a radar housing. In this case, the radome may be made of a material capable of reducing attenuation of the transmitted and received radar signals, and the radome may be configured as front and rear bumpers of the vehicle, a grill thereof, or the outer surface of a side vehicle frame or a vehicle component.

That is, the radome of the radar sensor may be disposed inside the vehicle grille, the bumper, the vehicle frame, or the like, or may be disposed as a part of components constituting the outer surface of the vehicle, such as a part of the vehicle grille, the bumper, or the vehicle frame, thereby providing convenience in mounting the radar sensor and a good appearance.

In the present disclosure, the radar sensor is not limited to any specific radar sensor, and the embodiments of the present disclosure may be substantially and identically applied to any radar sensor, except where not applicable.

As shown in FIG. 1, n radar sensors 110_1 to 110_n may be provided in the vehicle. Here, n is any natural number. For example, the radar sensors 110 may include five radar sensors, such as a front radar sensor for sensing in front of the vehicle, a left front radar sensor, a right front radar sensor, a left rear radar sensor, and a right rear radar sensor of the vehicle. However, this is only an example, and the present disclosure is not limited thereto. The number of radar sensors 110 may be varied as necessary.

The plurality of radar sensors 110 may be disposed at different positions of the vehicle. The plurality of radar sensors 110 may be configured to have different fields of sensing from each other depending on usage. For example, the five radar sensors described above may be disposed on the front portion, left front portion, right front portion, left rear portion, and right rear portion of the vehicle, respectively. In addition, transmission and reception of radar signals may be set such that the five radar sensors described above have a field of sensing covering the front area, a field of sensing covering the left front area, a field of sensing covering the right front area, a field of sensing covering the left rear area, and a field of sensing covering the right rear area.

The controller 130 may control the overall operation of the radar apparatus 100 for a vehicle. According to an example, the controller 130 may be implemented as an electronic control unit (ECU) or a central processing unit (CPU) or the like. The controller 130 is configured to receive the processing results of the image data and the sensing data from the processor and to process the image data and the sensing data. The controller 130, responsive at least in part to the processing of the image data and the sensing data, may perform control so as to hand over information on the object between the radar sensors.

When an object, such as another vehicle, enters the fields of sensing of the plurality of radar sensors 110, the controller 130 may receive a radar signal from the radar sensor 110 corresponding to the field of sensing that the object has entered. According to an example, the controller 130 may receive a radar signal that has been processed with noise removal, signal amplification, analog-to-digital conversion, Fast Fourier Transform (FFT), or the like, in the radar sensor 110, and may generate information on the target. Alternatively, according to another example, the controller 130 may receive information on the object, which is generated by the radar sensor 110 through the above-described signal processing.

When the object is duplicately detected by two or more radar sensors, the controller 130 may integrate two or more pieces of information on the objects, which have been detected by the two or more radar sensors. The fields of sensing of the radar sensors 110 may be set differently from each other depending on the radar sensors, and a portion of each field of sensing may overlap another field of sensing. When an object, such as another vehicle, is located in the overlapping area, the object may be duplicately detected by the radar sensor 110 corresponding to each field of sensing.

The controller 130 may compare the pieces of information on the detected object with each other to determine whether or not the object is duplicately detected. According to an example, the information on the object may include information on the position of the object, such as a distance to the object and an angle thereof based on the vehicle, information on the speed of the object, information on the size of the object, such as the area and length of the object, and the like.

If two or more pieces of information on the objects obtained by two or more radar sensors are the same, the controller 130 may determine that the same object has been duplicately detected. Here, that "two or more pieces of information on the objects are the same" may include the case in which the difference between the two or more pieces of information on the objects detected by the respective radar sensors is within a predetermined error range.

If it is determined that the object has been duplicately detected, the controller 130 may integrate two or more pieces of information on the objects into one, and may process the same. That is, the data for the same object may be integrated to then be processed, instead of processing the same separately. According to an example, the controller 130 may select one radar sensor, among the radar sensors by which the object has been duplicately detected, according to a predetermined condition. The controller 130 may obtain information on the object using the selected radar sensor, and may transmit the obtained information to a system that requires the same. However, the present disclosure is not limited to the above-described configuration, which is only an example, and various conditions may be set in advance, as necessary.

When an object moves from a field of sensing of a first radar sensor to a field of sensing of a second radar sensor, among a plurality of radar sensors, the controller 130 may perform control so as to hand over information on the object between the first radar sensor and the second radar sensor. The position of the object may be changed from one field of sensing to another field of sensing according to the movement of a vehicle or the movement of an object such as another vehicle.

In this case, for continuity of object detection, the controller 130 may detect the object through the second radar sensor using information on the object detected by the first radar sensor. When the object moves out of the field of sensing of the first radar sensor, the controller 130 may predict that the object will enter the field of sensing of the second radar sensor according to the movement of the object and the movement path thereof.

When the object is detected at the predicted position, the controller 130 may compare the information on the detected object with the information on the object detected in the previous field of sensing. As a result of the comparison, if both pieces of information on the objects are the same, the controller 130 may detect the object in a new field of sensing in association with the information on the object obtained in the previous field of sensing. Accordingly, the movement of the object around the vehicle can be seamlessly and continuously obtained.

According to the present disclosure, it is possible to efficiently process data when acquiring information on the detected object by integrating and processing information on the object that is duplicately detected by a plurality of radar sensors provided in a vehicle. In addition, it is possible to seamlessly and continuously detect the same object by handing over information on the object, which moves through the fields of sensing of a plurality of radar sensors provided in a vehicle, between the radar sensors, thereby obtaining information.

A radar apparatus 100 for a vehicle according to the present disclosure may include a plurality of radar sensors, disposed in the vehicle so as to have a predetermined field of sensing of the exterior of the vehicle and configured to capture sensing data, and a domain control unit (DCU), configured to process the sensing data captured by the plurality of radar sensors and configured to control at least one driver assistance system provided in the vehicle.

According to an example, the aforementioned processor and the controller for processing the sensing data and controllers of various devices provided in the vehicle may be integrated into a domain control unit. In this case, the domain control unit may generate various vehicle control signals to control the driver assistance system provided in the vehicle and various devices of the vehicle related thereto.

The domain control unit, responsive at least in part to the processing of the sensing data, may, when the object is duplicately detected by two or more of a plurality of radar sensors, integrate two or more pieces of information on the objects detected by two or more radar sensors, respectively, and when the object moves from the field of sensing of a first radar sensor to the field of sensing of a second radar sensor, among the plurality of radar sensors, may perform control so as to hand over information on the object between the first radar sensor and the second radar sensor.

The domain control unit may be provided inside the vehicle, and may communicate with one or more image sensors and non-image sensors including the radar sensors, which are mounted inside the vehicle. To this end, an appropriate data link or communication link, such as a vehicle network bus, for data transmission or signal communication may be further included.

The domain control unit may operate to control one or more of the driver assistance systems (DAS) used in the vehicle. The domain control unit may control a driver assistance system (DAS), such as a blind-spot detection (BSD) system, an adaptive cruise control (ACC) system, a lane departure warning system (LDWS), a lane-keeping assistance system (LKAS), a lane change assistance system (LCAS), and the like, based on the sensing data captured by a plurality of non-image sensors and the image data captured by the image sensor.

When an object, such as another vehicle, enters the fields of sensing of the plurality of radar sensors 110, the domain control unit may receive a radar signal from the radar sensor 110 corresponding to the field of sensing that the object has entered. According to an example, the domain control unit may receive a radar signal that is processed with noise removal, signal amplification, analog-to-digital conversion, Fast Fourier Transform (FFT), or the like, in the radar sensor 110, and may generate information on the target. Alternatively, according to another example, the domain control unit may receive information on the object, which is generated by the radar sensor 110 through the above-described signal processing. Alternatively, according to another example, the domain control unit may perform signal processing, such as noise removal, signal amplification, analog-to-digital conversion, Fast Fourier Transform (FFT), or the like, for the radar signal.

When the object is duplicately detected by two or more radar sensors, the domain control unit may integrate two or more pieces of information on the objects respectively detected by the two or more radar sensors into one. The fields of sensing of the radar sensors 110 may be set differently from each other depending on the radar sensors, and a portion of each field of sensing may overlap another field of sensing. When an object, such as another vehicle, is located in the overlapping area, the object may be duplicately detected by the radar sensor 110 corresponding to each field of sensing.

The domain control unit may compare two or more pieces of information on the detected objects to determine whether or not the object has been duplicately detected. According to an example, the information on the object may include information on the position of the object, such as the distance to the object and the angle thereof based on the vehicle, information on the speed of the object, information on the size of the object, such as the area and length of the object, and the like. If two or more pieces of information on the objects obtained by two or more radar sensors are the same, the domain control unit may determine that the same object has been duplicately detected. Here, the case in which two or more pieces of information on the objects are the same may include the case in which the difference between the two or more pieces of information on the objects detected by the respective radar sensors is within a predetermined error range.

If it is determined that the object has been duplicately detected, the domain control unit may integrate the two or more pieces of information on the objects into one, thereby processing the same. That is, the data for the same object may be integrated into one to then be processed, instead of processing the same separately. According to an example, the domain control unit may select one radar sensor, among the radar sensors by which the object has been duplicately detected, according to a predetermined condition. The domain control unit may obtain information on the object using the selected radar sensor, and may transmit the obtained information to a system that requires the same. However, the present disclosure is not limited to the above-described configuration, which is only an example, and various conditions may be set in advance, as necessary.

When an object moves from a field of sensing of a first radar sensor to a field of sensing of a second radar sensor, among a plurality of radar sensors, the domain control unit may perform control so as to hand over information on the object between the first radar sensor and the second radar sensor. The position of an object may be changed from one field of sensing to another field of sensing according to the movement of a vehicle or the movement of an object such as another vehicle.

In this case, for continuity of object detection, the domain control unit may detect the object through the second radar sensor using information on the object detected by the first radar sensor. When the object moves out of the field of sensing of the first radar sensor, the domain control unit may predict that the object will enter the field of sensing of the second radar sensor according to the movement of the object and the movement path thereof.

When the object is detected at the predicted position, the domain control unit may compare the information on the detected object with the information on the object detected in the previous field of sensing. As a result of the comparison, if both pieces of information on the object are the same, the domain control unit may detect the object in a new field of sensing in association with the information on the object obtained in the previous field of sensing. Accordingly, the movement of the object around the vehicle can be seamlessly and continuously obtained.

According to the present disclosure, it is possible to efficiently process data when acquiring information on the detected object by integrating and processing multiple pieces of information on the object that is duplicately detected by a plurality of radar sensors provided in a vehicle. In addition, it is possible to seamlessly and continuously detect the same object by handing over information on the object, which moves through the fields of sensing of a plurality of radar sensors provided in a vehicle, between the radar sensors, thereby obtaining information.

Hereinafter, the operation of a radar apparatus for a vehicle will be described in more detail with reference to the related drawings. The following description will be made with reference to the controller 130, but the present disclosure is not limited thereto. The following description of the operation of the controller 130 may be performed in substantially the same manner by the domain control unit, except for what is not applicable thereto.

Figure 2:
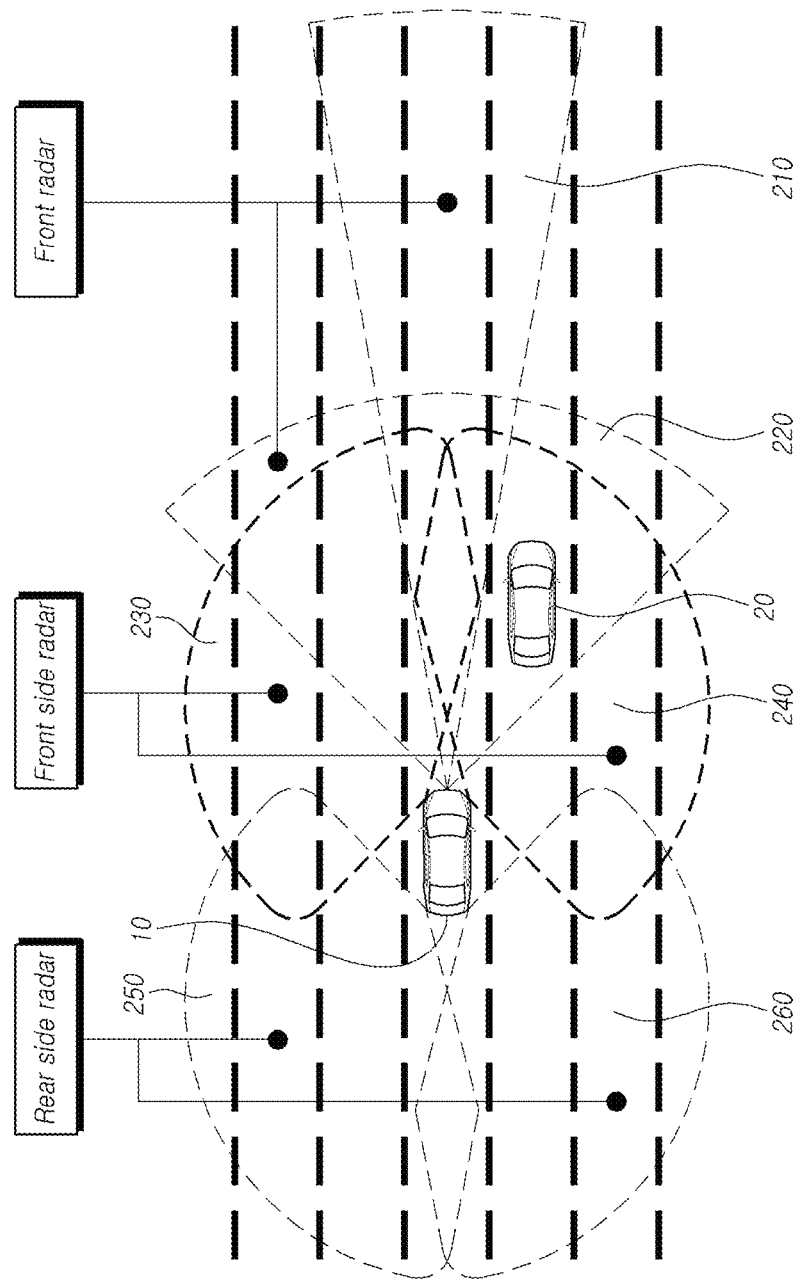
FIGS. 2 and 3 are diagrams for explaining acquisition of information on an object according to a field of sensing of each of a plurality of radar sensors and a position of an object, according to the present disclosure.
Figure 3:
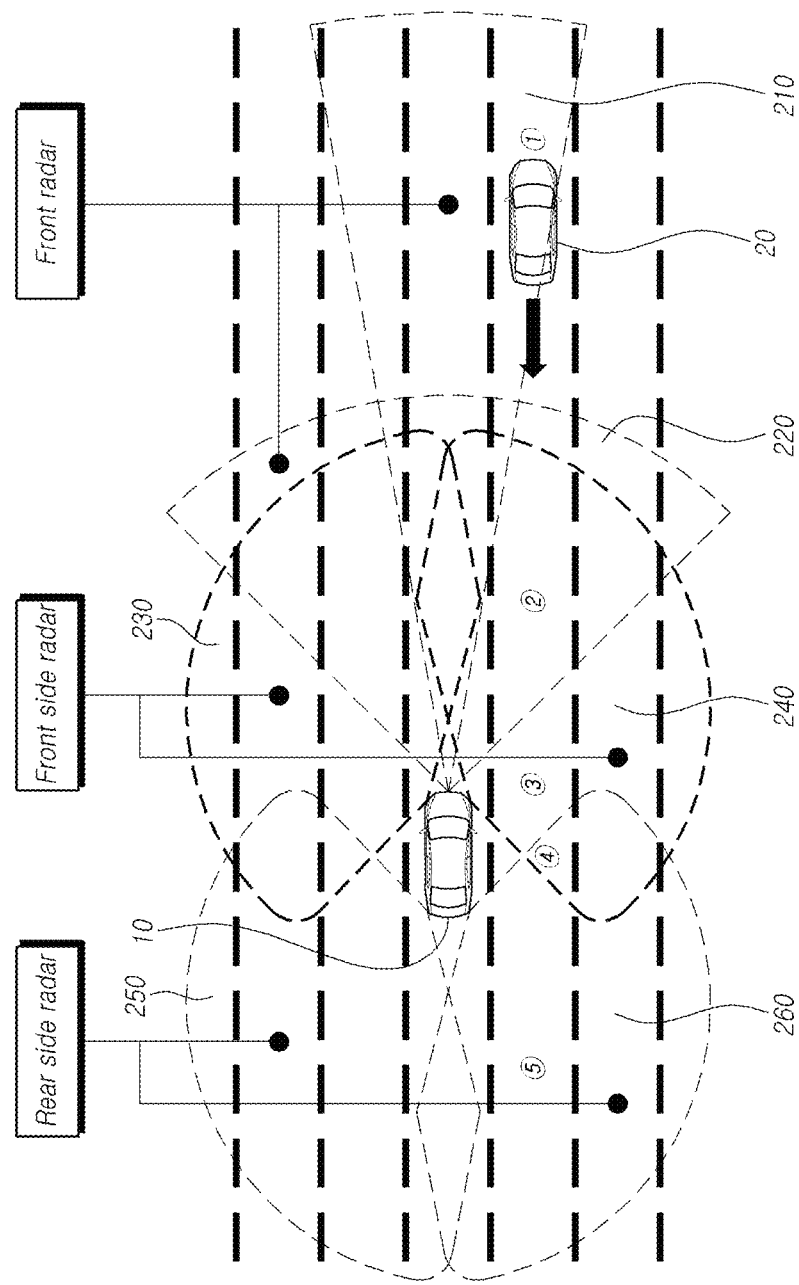

FIGS. 2 and 3 are diagrams for explaining acquisition of information on an object according to a field of sensing of each of a plurality of radar sensors and position of an object according to the present disclosure.

FIG. 2 illustrates fields of sensing of a plurality of radar sensors provided in a vehicle 10 according to an example. FIG. 2 shows long-range and short-range front fields of sensing 210 and 220 covered by a front radar sensor, a left front field of sensing 230 covered by a left front radar sensor, a right front field of sensing 240 covered by a right front radar sensor, a left rear field of sensing 250 covered by a left rear radar sensor, and a right rear field of sensing 260 covered by a right rear radar sensor.

The respective fields of sensing are set to face in different directions in different shapes with respect to the vehicle 10, depending on usage thereof. In addition, as shown in FIG. 2, the respective fields of sensing may overlap, in part, other fields of sensing. If an object is located in the overlapping area, the object may be duplicately detected by the respective radar sensors corresponding thereto.

For example, it is assumed that an object 20 is located in the front field of sensing 220 and the right front field of sensing 240, as shown in FIG. 2. In this case, the object 20 may be duplicately detected by the front radar sensor and the right front radar sensor. If the respective radar sensors process data on the detected object 20, the data is duplicately processed for the same object.

Accordingly, the controller 130 may compare two pieces of information on the objects detected by two radar sensors, thereby determining whether or not the respective detected objects are the same. The controller 130 may process radar signals received from the respective fields of sensing, thereby comparing the positions, speeds, areas, and lengths of the detected objects with each other. If the positions and speeds of the objects 20 detected in the two fields of sensing are the same, and if the sizes of the objects 20 are the same, the controller 130 may determine that the objects detected by the two radar sensors are the same.

If it is determined that the objects detected by the two radar sensors are the same, the controller 130 may determine that the object has been duplicately detected, thereby integrating both pieces of information on the objects into one and processing the same. According to an example, the controller 130 may select one radar sensor according to a predetermined condition, among the radar sensors by which the object has been duplicately detected. For example, the controller 130 may select the radar sensor by which the object has been detected before the object is duplicately detected, among the radar sensors by which the object has been duplicately detected, and may obtain information on the object using the same. However, the present disclosure is not limited to the above-described configuration, which is only an example, and various conditions may be set in advance, as necessary.

The controller 130 may obtain information on the object through the selected radar sensor while the object 20 is located in the overlapping area. In this case, the controller 130 may discard the information on the duplicately detected object, which is received from the unselected radar sensor, without further processing. Alternatively, the information on the duplicately detected object, which is received from the unselected radar sensor, may be deleted after being temporarily stored for a predetermined period of time.

According to an example, information on each overlapping area according to the fields of sensing of a plurality of radar sensors 110 may be separately stored. The controller 130 may use the information on the overlapping area when determining whether or not the object is duplicately detected. The controller 130 may further determine whether or not the object exists in the overlapping area while determining whether or not multiple pieces of information on the detected objects are the same, thereby increasing accuracy.

According to the present disclosure, multiple pieces of information on the object that is duplicately detected by a plurality of radar sensors provided in a vehicle can be integrated and processed to process data more efficiently by reducing redundant and unnecessary data processing.

FIG. 3, according to an example, shows that the detection position of the object 20 is shifted from the right side of the vehicle 10 to the rear thereof (e.g., by relatively increasing the speed of the vehicle 10). In position ①, the object 20 may be detected in the long-range front field of sensing 210. In position ②, the object 20 may be detected in the short-range front field of sensing 220 and the right front field of sensing 240. In position ③, the object 20 may be detected in the right front field of sensing 240. In position ④, the object 20 may be detected in the right front field of sensing 240 and the right rear field of sensing 260. In position ⑤, the object 20 may be detected in the right rear field of sensing 260.

However, this is only an example, and the movement of the object 20 is not limited thereto. The description of the present disclosure can also be applied, in substantially the same manner, to, for example, the case where the object 20 makes a lateral movement, such as a lane change, while traveling along with the vehicle 10. That is, in the case where the object 20 moves between the fields of sensing of different radar sensors provided in the vehicle 10, the description of the present disclosure can be applied thereto in substantially the same manner.

When the object 20 moves from the field of sensing of the first radar sensor to the field of sensing of the second radar sensor, the controller 130 may continuously track the object 20 in the field of sensing of the second radar sensor using the information on the object 20 detected by the first radar sensor.

According to the movement of the object 20 detected in the long-range front field of sensing 210 (position ①), the object 20 may move to the right front field of sensing 240 (position ②) through the short-range front field of sensing 220. If the information on the object 20 is not handed over between the radar sensors, although the current position (position ②) of the object 20 may be detected in the same manner, continuity with the object detected in the previous long-range front field of sensing 210 cannot be ensured.

Even when the field of sensing in which the object 20 is detected is changed, in order to ensure continuous detection of the same object, the controller 130 may detect the object 20 using information on the object detected in the previous field of sensing 210 when the object 20 enters a new field of sensing 240. That is, as shown in FIG. 3, when the object moves out of the field of sensing 210 or 220 of the front radar sensor, the controller 130 may predict that the object will enter the right front field of sensing 240 according to the movement of the object and the movement path thereof.

The controller 130 may calculate the predicted position of the object 20 when the object enters the field of sensing of the second radar sensor (the right front radar sensor in this case) based on the information on the object detected by the first radar sensor (the front radar sensor in this case). If the object is detected at the predicted position of the right front field of sensing 240, the controller 130 may compare the information on the detected object with the information on the object detected in the previous field of sensing.

The controller 130 may process radar signals received from the respective fields of sensing to compare the positions, speeds, areas, and lengths of the detected objects with each other. If the detected objects 20 have the same information, such as the speed, size, or the like, the controller 130 may determine that the object 20 has moved from the previous field of sensing 210 to the current field of sensing 240.

If it is determined that the object 20 has moved between the fields of sensing, the controller 130 may perform detection of the object in a new field of sensing in association with the information on the object obtained in the previous field of sensing. Accordingly, the movement of the object around the vehicle can be seamlessly and continuously obtained.

According to an example, the controller 130 may assign a unique identification number (ID) to the object 20. The controller 130 may perform control so as to transmit, to a signal processor of the second radar sensor or the controller 130, the information on the object generated by the first radar sensor together with the corresponding identification number. The controller 130 may control the vehicle 10 using the received information on the object in the previous field of sensing and the information on the object detected in the current field of sensing, or may transmit the same to another control system provided in the vehicle.

The above description has been made on the assumption that the object 20 moves from the position ① to the position ②. The above description can also be applied, in substantially the same manner, to the case where the object 20 moves to the position ⑤ through the position ③ and the position ④. Although the above description has been made on the assumption that the traveling direction of the object 20 is opposite the traveling direction of the vehicle 10, the present disclosure is not limited thereto. The description of the present disclosure for duplicate detection and handover can be applied, in substantially the same manner, to the case where the travelling direction of the object 20 is the same as that of the vehicle 10 or to the case where the object 20 moves laterally with respect to the vehicle 10.

Although one object has been described above, the present disclosure is not limited thereto. When a plurality of objects are provided, the controller 130 may assign a unique identification number (ID) to each object, and may perform control so as to handover the information together with the identification number. That is, the controller 130 may assign an identification number to each of a plurality of objects in the fields of sensing, and when the object moves to another field of sensing, may hand over the information on the object together with the corresponding identification number.

According to the present disclosure, it is possible to efficiently process data when acquiring information on the detected object by integrating and processing multiple pieces of information on the object that is duplicately detected by a plurality of radar sensors provided in a vehicle. In addition, it is possible to seamlessly and continuously detect the same object by handing over information on the object, which moves through the fields of sensing of a plurality of radar sensors provided in a vehicle, between the radar sensors, thereby obtaining information.

The operation of the radar apparatus 100 for a vehicle in detection of an object and duplicate detection thereof using a plurality of radar sensors, and in handover of information has been described above. Hereinafter, a configuration for processing data in duplicate detection of an object or handover will be described.

Figure 4:
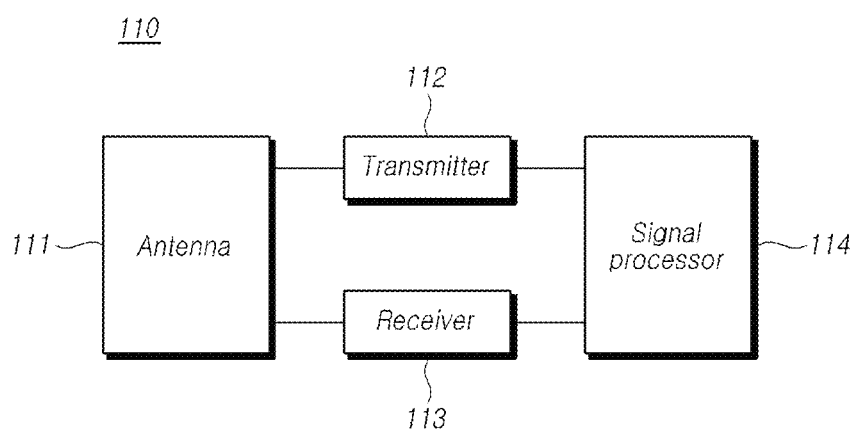
FIG. 4 is a block diagram of a radar sensor according to the present disclosure.
Figure 5:
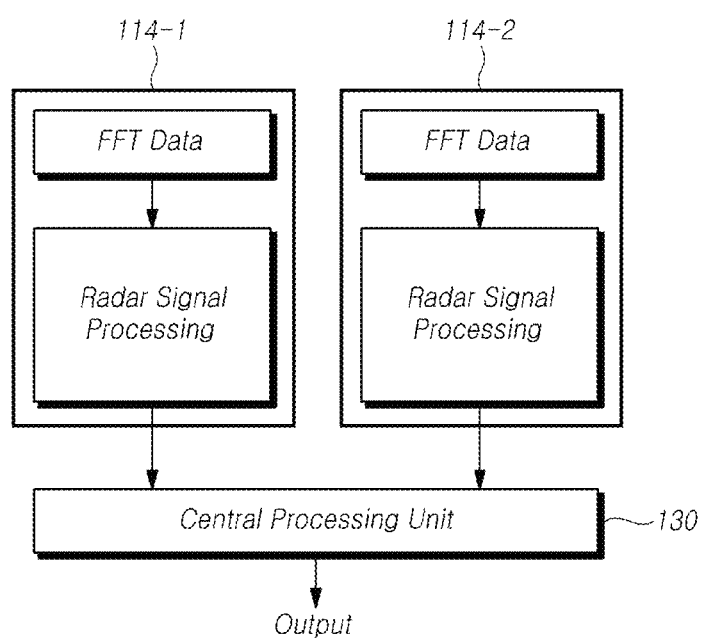
FIGS. 5 to 7 are diagrams for explaining generation, integration, or handover of information on an object according to the present disclosure.
Figure 6:
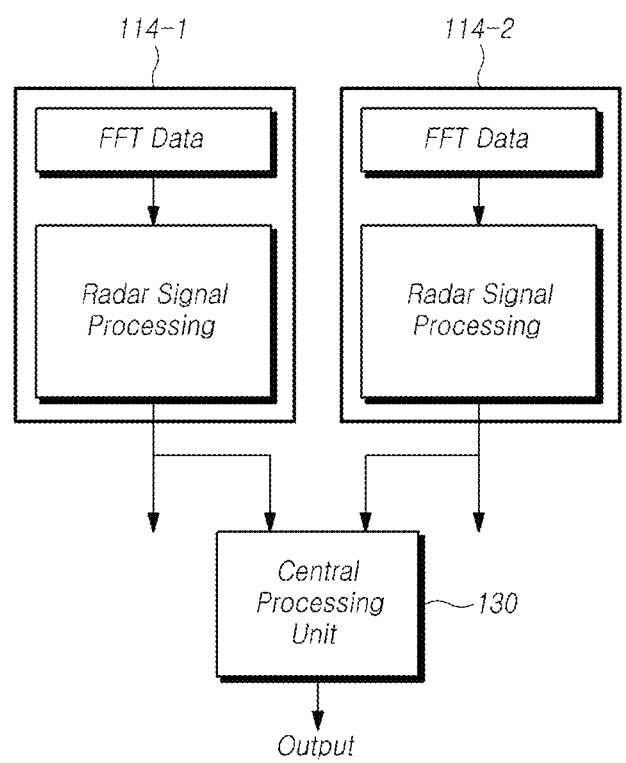
Figure 7:
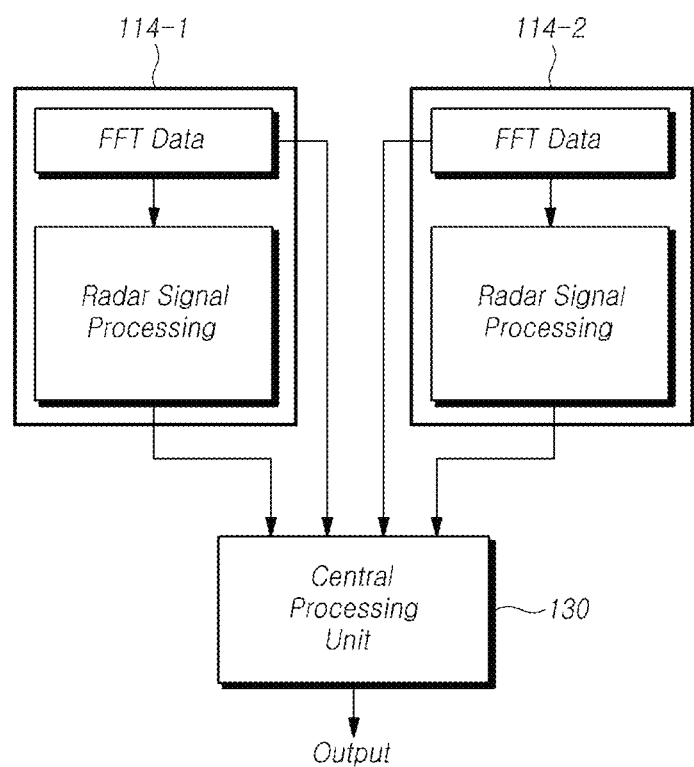

FIG. 4 is a block diagram of a radar sensor according to the present disclosure. FIGS. 5 to 7 are diagrams for explaining the generation, integration, or handover of information on an object according to the present disclosure.

Referring to FIG. 4, each of a plurality of radar sensors 110 provided in the vehicle includes an antenna 111, a transmitter 112 for generating a radar signal and transmitting the same through the antenna, a receiver 113 for receiving a radar signal reflected by the object through the antenna, and a signal processor 114 for processing the received radar signal.

The antenna 111 may include at least one transmission antenna and at least one reception antenna. According to an example, the transmission antenna and the reception antenna may be implemented as array antennas. However, the present disclosure is not limited to the above configuration, which is only an example, and the antenna 111 is not limited to any specific antenna, as long as it can be installed in a vehicle and can transmit/receive signals.

The transmitter 112 may generate a radar signal to be transmitted through the antenna. According to an example, the transmitter 112 may include means for generating chirp signals that are transmitted by the antenna, reflected, and received. The chirp signal may be a Frequency Modulated Continuous Wave (FMCW) signal having a specific amplitude.

The receiver 113 may receive a radar signal through the antenna, thereby processing the same. For example, the receiver 113 may be configured to include a configuration such as an analog-digital converter (ADC) for converting the received radar signal into a baseband signal, amplifying the baseband signal, and converting the same into a digital signal.

According to an example, the signal processor 114 may be implemented as a micro control unit (MCU). The signal processor 114 may simultaneously sample and analyze phases and amplitudes of the received radar signals using the digitalized signals, thereby calculating the azimuth angle of the object or the like. The analysis may be performed by a digital signal processor (DPS) using Fast Fourier Transform (FFT). In this case, the signal processor 114 may conceptually include a digital signal processor.

Although the configuration of the radar sensor 110 has been described above, this is only an example, and the present disclosure is not limited thereto. The radar sensor 110 is not limited to any specific type, as long as the description of the present disclosure can be applied thereto, and may further include configurations other than those described in FIG. 4. In addition, the operations of the respective configurations may vary in some cases, as long as the description of the present disclosure can be applied thereto.

According to an example, FIG. 5 illustrates a controller 130, a signal processor 114_1 of a first radar sensor, and a signal processor 114_2 of a second radar sensor. It is assumed that an object is duplicately detected by the first radar sensor and the second radar sensor, or that the object moves from the field of sensing of the first radar sensor to the field of sensing of the second radar sensor.

According to an example, the signal processor 114_1 of the first radar sensor and the signal processor 114_2 of the second radar sensor may perform FFT processing on the received radar signal, and may perform radar signal processing for obtaining information on the object.

According to an example, the controller 130 may receive radar signals processed by the signal processor 114_1 of the first radar sensor and the signal processor 114_2 of the second radar sensor, thereby generating information on the object.

The controller 130 may also determine whether or not the object has been duplicately detected based on the radar signals received from the signal processor 114_1 of the first radar sensor and the signal processor 114_2 of the second radar sensor. If it is determined that the object has been duplicately detected, the controller 130 may integrate the information on the objects as described above.

In addition, the controller 130, based on the radar signals received from the signal processor 114_1 of the first radar sensor and the signal processor 114_2 of the second radar, may determine whether or not the object has moved from the field of sensing of the first radar sensor to the field of sensing of the second radar sensor. If the movement of the object is identified, the controller 130 may perform control so as to hand over the information on the object, as described above.

In this case, the controller 130 may perform generation of information on the object, integration of information in duplicate detection, and control for handover using the radar signal processed by the radar sensor.

FIG. 6 illustrates a controller 130, a signal processor 114_1 of a first radar sensor, and a signal processor 114_2 of a second radar sensor according to an embodiment. Similarly, it is assumed that an object is duplicately detected by the first radar sensor and the second radar sensor, or that the object moves from the field of sensing of the first radar sensor to the field of sensing of the second radar sensor.

According to an example, the signal processor 114_1 of the first radar sensor and the signal processor 114_2 of the second radar sensor may perform FFT processing on the received radar signals, and may perform radar signal processing required to obtain information on the object. In addition, the signal processor 114_1 of the first radar sensor and the signal processor 114_2 of the second radar sensor, based on the processed radar signals, may generate information on the object. The signal processor 114_1 of the first radar sensor and the signal processor 114_2 of the second radar sensor may transmit the generated information to the controller 130 and other control systems.

According to an example, based on the information on the objects received from the signal processor 114_1 of the first radar sensor and the signal processor 114_2 of the second radar sensor, the controller 130 may determine whether or not the object has been duplicately detected. If it is determined that the object has been duplicately detected, the controller 130 may integrate the information on the objects into one, as described above.

In addition, based on the information on the objects received from the signal processor 114_1 of the first radar sensor and the signal processor 114_2 of the second radar sensor, the controller 130 may determine whether or not the object has moved from the field of sensing of the first radar sensor to the field of sensing of the second radar sensor. If the movement of the object is identified, the controller 130 may perform control so as to hand over the information on the object, as described above.

In this case, the respective signal processors of the radar sensors may generate information on the object according to the received radar signals, and the controller 130 may perform integration for duplicate detection and control for handover using the information on the object received from the radar sensors.

FIG. 7 illustrates a controller 130, a signal processor 114_1 of a first radar sensor, and a signal processor 114_2 of a second radar sensor according to an embodiment. Similarly, it is assumed that an object is duplicately detected by the first radar sensor and the second radar sensor, or that the object moves from the field of sensing of the first radar sensor to the field of sensing of the second radar sensor.

According to an example, the signal processor 114_1 of the first radar sensor and the signal processor 114_2 of the second radar sensor may perform FFT processing on the received radar signals, and may perform radar signal processing required to obtain information on the object. Alternatively, the signal processor 114_1 of the first radar sensor and the signal processor 114_2 of the second radar sensor, based on the processed radar signals, may generate information on the object. The signal processor 114_1 of the first radar sensor and the signal processor 114_2 of the second radar sensor may transmit the processed signals or the generated information to the controller 130.

According to an example, the controller 130 may receive radar signals processed by the signal processor 114_1 of the first radar sensor and the signal processor 114_2 of the second radar sensor, thereby generating information on the object. Alternatively, the controller 130 may process the radar signals received from the signal processor 114_1 of the first radar sensor and the signal processor 114_2 of the second radar sensor, thereby generating information on the object.

According to an example, the controller 130 may determine whether or not the object has been duplicately detected based on the generated information on the object and the information on the objects received from the signal processor 114_1 of the first radar sensor and the signal processor 114_2 of the second radar sensor. If it is determined that the object has been duplicately detected, the controller 130 may integrate the information on the object as described above.

In addition, the controller 130, based on the generated information on the object and the information on the objects received from the signal processor 114_1 of the first radar sensor and the signal processor 114_2 of the second radar, may determine whether or not the object has moved from the field of sensing of the first radar sensor to the field of sensing of the second radar sensor. If the movement of the object is identified, the controller 130 may perform control so as to hand over the information on the object, as described above.

In this case, the respective signal processors of the radar sensors may perform the processing of the received radar signals or the generation of information on the object, and the controller 130 may generate information on the object using the radar signals processed by the respective radar sensors, and may perform integration for duplicate detection and control for handover using the generated information on the object and the information on the object received from the radar sensors.

As described above, a method of performing the operations related to the generation of information on the object, the integration for duplicate detection, and the control for handover may include a central operation method in which all operations are collectively performed by the controller or a parallel operation method using the controller and the signal processors of the radar sensors together.

A method of controlling the radar apparatus for a vehicle according to the present disclosure may be implemented in the radar apparatus 100 for a vehicle described above. Hereinafter, a method of controlling a radar apparatus for a vehicle according to the present disclosure and the operation of a radar apparatus 100 for a vehicle for implementing the same will be described in detail with reference to the necessary drawings.

Figure 8:
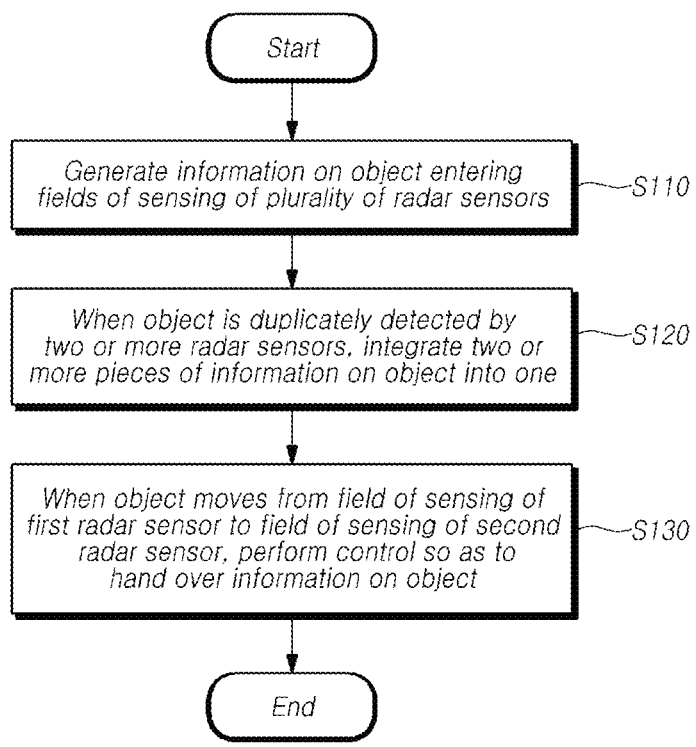
FIG. 8 is a flowchart illustrating a method of controlling a radar apparatus for a vehicle according to the present disclosure.

FIG. 8 is a flowchart of a method of controlling a radar apparatus for a vehicle according to the present disclosure.

Referring to FIG. 8, a radar apparatus for a vehicle, based on a radar signal reflected by an object entering fields of sensing of a plurality of radar sensors, may generate information on the object (S110).

The radar apparatus for a vehicle may include a plurality of radar sensors, each having a predetermined field of sensing. For example, the radar sensors may include five radar sensors, namely a front radar sensor for sensing an area in front of the vehicle, a left front radar sensor, a right front radar sensor, a left rear radar sensor, and a right rear radar sensor of the vehicle. However, this is only an example, and the present disclosure is not limited thereto. The number of radar sensors may be varied as necessary.

The plurality of radar sensors may be disposed at different positions of the vehicle. The plurality of radar sensors may be configured to have different fields of sensing from each other depending on usage. For example, the five radar sensors described above may be disposed on the front portion, left front portion, right front portion, left rear portion, and right rear portion of the vehicle, respectively. In addition, transmission and reception of radar signals may be set such that the five radar sensors described above have a field of sensing covering the front area, a field of sensing covering the left front area, a field of sensing covering the right front area, a field of sensing covering the left rear area, and a field of sensing covering the right rear area.

When an object, such as another vehicle, enters the fields of sensing of the plurality of radar sensors, a controller of the radar apparatus for a vehicle may receive radar signals from the radar sensors corresponding to the fields of sensing that the object has entered. According to an example, the controller may receive a radar signal that has been processed with noise removal, signal amplification, analog-to-digital conversion, Fast Fourier Transform (FFT), or the like by the radar sensor, and may generate information on the object. Alternatively, according to another example, the controller may receive information on the object, which is generated by the radar sensor through the above-described signal processing.

Referring back to FIG. 8, when the object is duplicately detected by two or more of the plurality of radar sensors, the radar apparatus for a vehicle may integrate two or more pieces of information on the objects, which are detected by the two or more radar sensors, into one (S120).

The fields of sensing of the radar sensors may be set differently from each other depending on the radar sensors, and a portion of each field of sensing may overlap another field of sensing. When an object, such as another vehicle, is located in the overlapping area, the object may be duplicately detected by the radar sensor corresponding to each field of sensing.

The controller of the radar apparatus for a vehicle may compare two or more pieces of information on the detected objects with each other, thereby determining whether or not the object has been duplicately detected. According to an example, the information on the object may include information on the position of the object, such as a distance to the object and an angle thereof based on the vehicle, information on the speed of the object, information on the size of the object, such as the area and length of the object, and the like. If two or more pieces of information on the objects obtained by two or more radar sensors are the same, the controller may determine that the same object has been duplicately detected.

If it is determined that the object has been duplicately detected, the controller may integrate the two or more pieces of information on the objects into one, and may process the same. That is, the data for the same object may be integrated to then be processed, instead of processing the same separately. According to an example, the controller may select one radar sensor, among the radar sensors by which the object has been duplicately detected, according to a predetermined condition. For example, the controller may select the radar sensor by which the object has been detected before the object is duplicately detected, among the radar sensors detecting the object duplicately, and may obtain information on the object using the same. However, the present disclosure is not limited to the above-described configuration, which is only an example, and various conditions may be set in advance, as necessary.

Referring back to FIG. 8, when an object moves from a field of sensing of a first radar sensor to a field of sensing of a second radar sensor, among a plurality of radar sensors, the radar apparatus for a vehicle may perform control so as to hand over information on the object between the first radar sensor and the second radar sensor (S130).

The position of an object may be changed from one field of sensing to another field of sensing according to the movement of a vehicle or the movement of an object such as another vehicle. In this case, for continuity of object detection, the controller may detect the object through the second radar sensor using information on the object detected by the first radar sensor. When the object moves out of the field of sensing of the first radar sensor, the controller may predict that the object will enter the field of sensing of the second radar sensor according to the movement of the object and the movement path thereof.

If the object is detected at the predicted position, the controller may compare the information on the detected object with the information on the object detected in the previous field of sensing. As a result of the comparison, if both pieces of information on the objects are the same, the controller may detect the object in a new field of sensing in association with the information on the object obtained in the previous field of sensing. Accordingly, the movement of the object around the vehicle can be seamlessly and continuously obtained.

According to the present disclosure, it is possible to efficiently process data when acquiring information on the detected object by integrating and processing multiple pieces of information on the object that is duplicately detected by a plurality of radar sensors provided in a vehicle. In addition, it is possible to seamlessly and continuously detect the same object by handing over information on the object, which moves through the fields of sensing of a plurality of radar sensors provided in a vehicle, between the radar sensors, thereby obtaining information.

Figure 9:
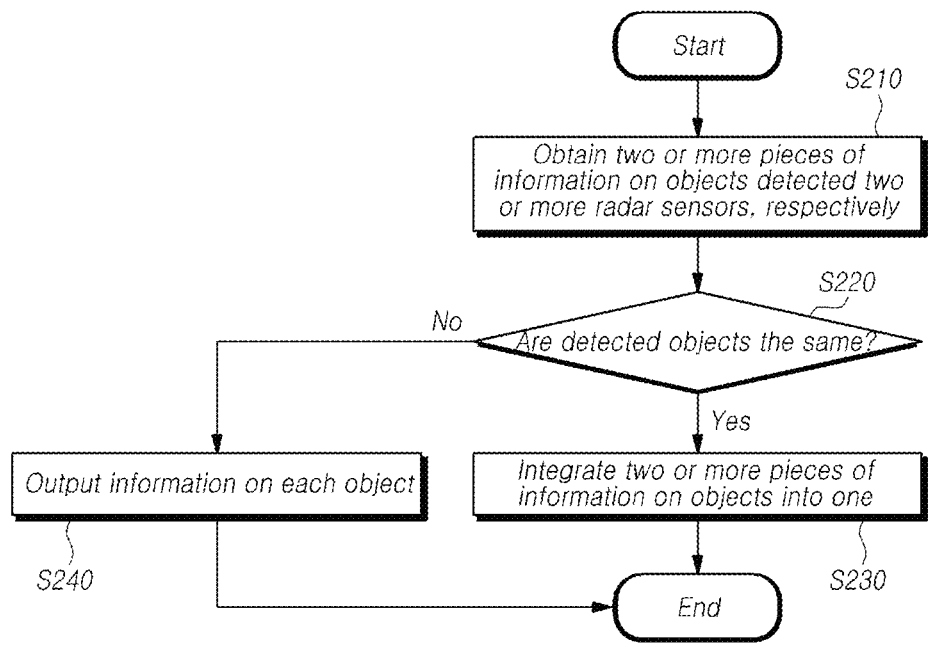
FIG. 9 is a flowchart illustrating a method of integrating information on an object, which is duplicately detected, according to the present disclosure.

FIG. 9 is a flowchart illustrating a method of integrating information on an object, which is duplicately detected, according to the present disclosure.

Referring to FIG. 9, a radar apparatus for a vehicle may obtain two or more pieces of information on objects detected by two or more radar sensors, respectively (S210). According to an example, it is assumed that fields of sensing of a plurality of radar sensors provided in a vehicle include a front field of sensing covered by a front radar sensor, a left front field of sensing covered by a left front radar sensor, a right front field of sensing covered by a right front radar sensor, a left rear field of sensing covered by a left rear radar sensor, and a right rear field of sensing covered by a right rear radar sensor.

The respective fields of sensing are set to be directed in different directions in different shapes with respect to the vehicle, depending on its usage. The respective fields of sensing may overlap, in part, other fields of sensing. If an object is located in the overlapping area, the object may be duplicately detected by the respective radar sensors corresponding thereto. If the respective radar sensors process data on the detected object, the data will be duplicately processed for the same object.

Accordingly, a controller of the radar apparatus for a vehicle may compare both pieces of information on the objects detected by two radar sensors, thereby determining whether or not the detected objects are the same (S220). The controller may process radar signals received from the respective fields of sensing to thus compare the positions, speeds, areas, and lengths of the detected objects. If the positions and speeds of the objects detected in the two fields of sensing are the same, and if the sizes of the objects are the same, the controller may determine that the objects detected by the two radar sensors are the same.

If it is determined that the objects detected by the two radar sensors are the same (Yes in S220), the controller of the radar apparatus for a vehicle may determine that the object has been duplicately detected, thereby integrating both pieces of information on the objects into one and processing the same (S230). According to an example, the controller may select one radar sensor according to a predetermined condition, among the radar sensors by which the object has been duplicately detected. For example, the controller may select the radar sensor by which the object has been detected before the object is duplicately detected, among the radar sensors by which the object has been duplicately detected, and may obtain information on the object using the same. However, the present disclosure is not limited to the above-described configuration, which is only an example, and various conditions may be set in advance as necessary.

The controller may obtain information on the object through the selected radar sensor while the object is located in the overlapping area. In this case, the controller may discard the information on the duplicately detected object, which is received from the unselected radar sensor, without further processing. Alternatively, the information on the duplicately detected object, which is received from the unselected radar sensor, may be deleted after being temporarily stored for a predetermined period of time.

According to an example, information on each overlapping area may be separately stored according to the fields of sensing of a plurality of radar sensors. The controller may use the information on the overlapping area when determining whether or not the object is duplicately detected. The controller may further determine whether or not the object exists in the overlapping area while determining whether or not both pieces of information on the detected objects are the same, thereby increasing the accuracy.

If it is determined that the objects detected by the two radar sensors are not the same (No in S220), the controller of the radar apparatus for a vehicle may determine that different objects have been detected by the respective radar sensors, and may process the information on the objects separately, thereby controlling the vehicle or outputting the information to a control system that requires the same (S230).

According to the present disclosure, two or more pieces of information on the object that is duplicately detected by a plurality of radar sensors provided in a vehicle may be integrated and processed to more efficiently process data by reducing redundant and unnecessary data processing.

Figure 10:
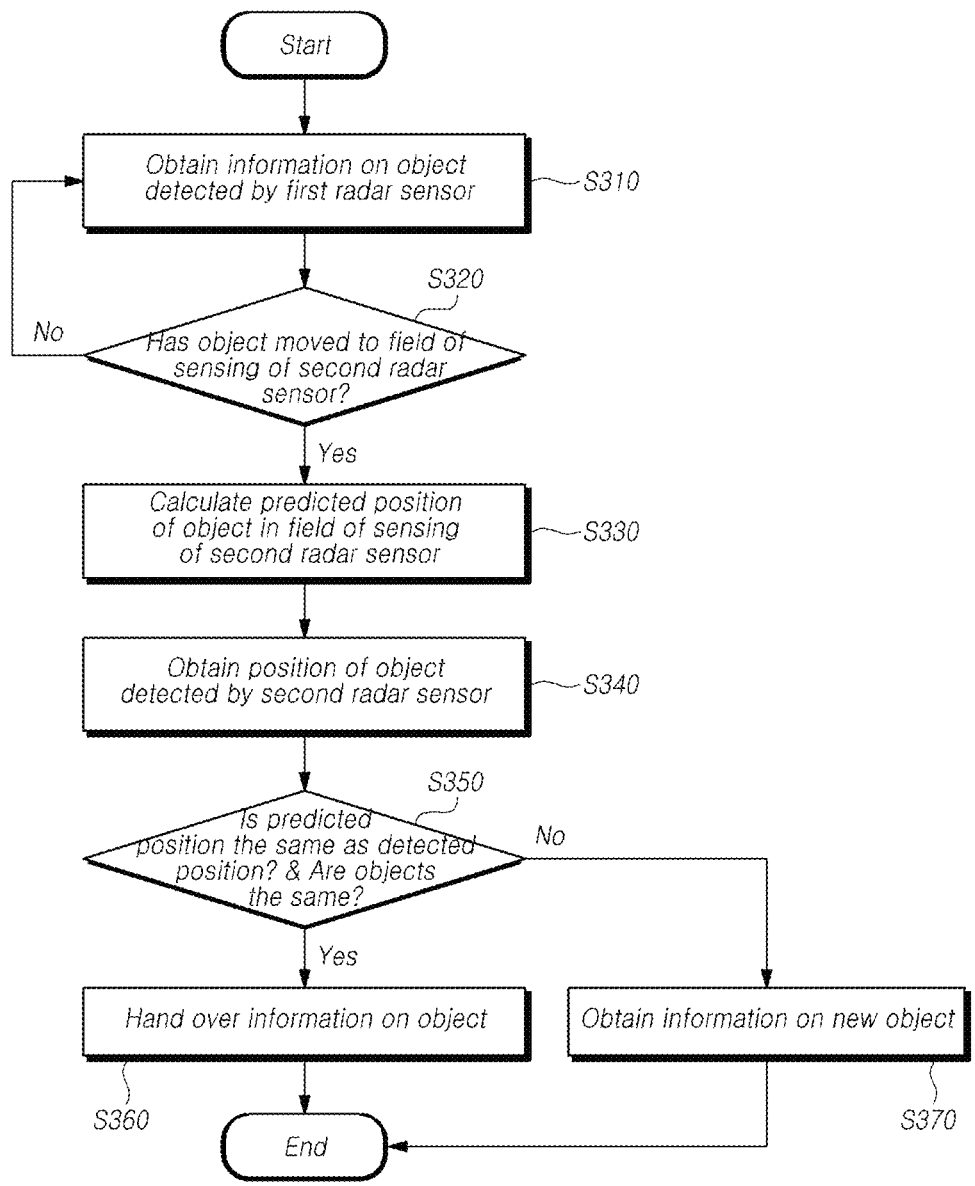
FIG. 10 is a flowchart illustrating a method of handing over information on an object moving between the fields of sensing according to the present disclosure.

FIG. 10 is a flowchart illustrating a method of handing over information on an object moving between fields of sensing according to the present disclosure.

Referring to FIG. 10, a controller of a radar apparatus for a vehicle may obtain information on an object detected by a first radar sensor (S310). The controller may determine, based on the obtained information, whether or not the object moves out of the field of sensing of the first radar sensor to the field of sensing of the second radar sensor (S320). If the object remains in the field of sensing of the first radar sensor (No in S320), the controller may obtain information on the object according to the detection result of the first radar sensor.

If the object moves from the first radar sensor to the second radar sensor (Yes in S320), the controller may calculate the predicted position of the object when it enters the field of sensing of the second radar sensor (S330). The controller may identify the movement path of the object based on position and speed information of the object. When the object moves to the edge of the field of sensing of the first radar sensor, the controller may predict the second radar sensor, which is supposed to detect the object, and the entry position of the object according to the movement path.

If an object is detected by the second radar sensor, the controller may obtain the position of the object detected by the second radar sensor (S340). If the object is detected at the position predicted in step S330, the controller may compare information on the detected object with information on the object detected in the previous field of sensing (S350).

The controller may process radar signals received from the respective fields of sensing to compare the positions, speeds, areas, and lengths of the detected objects. If the detected objects have the same information, such as speeds, sizes, etc. (Yes in S350), the controller may determine that the object has moved from the previous field of sensing to the current field of sensing.

If it is determined that the object has moved between the fields of sensing, the controller may perform detection of the object in a new field of sensing in association with the information on the object obtained in the previous field of sensing. Accordingly, the movement of the object around the vehicle may be seamlessly and continuously obtained.

According to an example, the controller may assign a unique identification number (ID) to the object. The controller may perform control so as to transmit, to a signal processor of the second radar sensor or the controller, information on the object generated by the first radar sensor together with the corresponding identification number. The controller may control the vehicle using the received information on the object in the previous field of sensing and the information on the object detected in the current field of sensing, or may transmit the same to other control systems provided in the vehicle.

Accordingly, when the object moves from the field of sensing of the first radar sensor to the field of sensing of the second radar sensor, the controller may continuously track the object in the field of sensing of the second radar sensor using the information on the object detected by the first radar sensor. That is, the information on the object is handed over between the radar sensors, thereby ensuring continuity between the object detected in the current field of sensing and the object detected in the previous field of sensing.

If the information, such as the speed, the size, and the like of the object, detected by the second radar sensor is not the same as the information on the object detected by the first radar sensor (No in S350), the controller may determine that the object detected by the second radar sensor is a new object, thereby obtaining information on the new object (S370).

Although one object has been described above, the present disclosure is not limited thereto. When a plurality of objects are detected, the controller may assign unique identification numbers (IDs) to the respective objects, and may perform control so as to handover the information together with the identification numbers. That is, the controller may assign identification numbers to the respective objects in the field of sensing, and when the objects move to other fields of sensing, the controller may hand over the information on the objects together with the corresponding identification numbers.

According to the present disclosure, it is possible to seamlessly and continuously detect the same object by handing over information on the object, which moves through the fields of sensing of a plurality of radar sensors provided in a vehicle, between the radar sensors, thereby obtaining information.

The above-described disclosure may be implemented as computer-readable code on a medium on which a program is recorded. The computer-readable medium includes all kinds of recording devices in which data that can be read by a computer system is stored. For example, the computer-readable medium includes a hard disk drive (HDD), a solid state disk (SSD), a silicon disk drive (SDD), a ROM, a RAM, a CD-ROM, a magnetic tape, a floppy disk, and an optical data storage device. In addition, the computer-readable medium may be implemented in the form of a carrier wave (e.g., transmission over the Internet).

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. A radar apparatus for a vehicle, the apparatus comprising:
   a plurality of radar sensors disposed at the vehicle and configured to capture sensing data, each radar sensor having a field of sensing of a surrounding around the vehicle;
   at least one processor configured to process the sensing data captured by the plurality of radar sensors; and a controller configured to, responsive at least in part to processing by the processor of the sensing data, generate information on the object based on a radar signal reflected by the object entering the fields of sensing of the plurality of radar sensors, wherein two or more radar sensors' fields of sensing of the surrounding are partially overlapped with each other, and the controller is configured to: when the two or more radar sensors duplicately detect the object at the overlapped field of the two or more radar sensors, select sensing data of one radar sensor, which has detected the object before the two or more radar sensors duplicately detect the object at the overlapped field of the two or more radar sensors, among the sensing data of the one radar sensor which has detected the object first before the two or more radar sensors duplicately detect the object and sensing data of an other radar sensor which detects the object later after the two or more radar sensors duplicately detect the object, and perform control of the vehicle based on the selected sensing data of the one radar sensor for the overlapped field of the two or more radar sensors.

2. The apparatus of claim 1, wherein the controller is configured to compare the two or more pieces of information on the objects detected by the two or more radar sensors with each other, thereby determining whether or not the detected objects are the same, and is configured to determine that the object has been duplicately detected if the detected objects are the same.

3. The apparatus of claim 1, wherein the controller is configured to, when the object moves from the field of sensing of the first radar sensor to the field of sensing of the second radar sensor, continuously track the object in the field of sensing of the second radar sensor using the information on the object detected by the first radar sensor.

4. The apparatus of claim 3, wherein the controller is configured to calculate a predicted position of the object in the field of sensing of the second radar sensor based on the information on the object detected by the first radar sensor, and is configured to, if the position of the object detected by the second radar sensor is the same as the predicted position, hand over the information on the object from the first radar sensor to the second radar sensor.

5. The apparatus of claim 1, wherein the information on the object comprises information on a position, a speed, an area, and a length of the object.

6. The apparatus of claim 1, wherein the controller is configured to, when a plurality of objects are provided, assign a unique identification number (ID) to each object, and is configured to perform control so as to hand over the identification number.

7. The apparatus of claim 1, wherein each of the plurality of radar sensors comprises:
   an antenna;
   a transmitter configured to generate a radar signal and configured to transmit the same through the antenna;
   a receiver configured to receive a radar signal reflected by the object through the antenna; and
   a signal processor configured to process the received radar signal.

8. The apparatus of claim 7, wherein the controller is configured to: receive radar signals processed by the respective signal processors of the plurality of radar sensors, thereby generating the information on the object; when the object is duplicately detected, integrate multiple pieces of information on the object into one; and when the object moves from the field of sensing of the first radar sensor to the field of sensing of the second radar sensor, perform control so as to hand over the information on the object.

9. The apparatus of claim 7, wherein the signal processor included in each of the plurality of radar sensors is configured to process the received radar signal, thereby generating the information on the object, and is configured to output the information on the object to the controller and a system in the vehicle, and wherein the controller, based on the information on the object received from the signal processor, is configured to, when the object is duplicately detected, integrate multiple pieces of information on the object into one, and is configured to, when the object moves from the field of sensing of the first radar sensor to the field of sensing of the second radar sensor, perform control so as to hand over the information on the object.

10. The apparatus of claim 7, wherein the signal processor included in each of the plurality of radar sensors is configured to: process the received radar signal; generate the information on the object from the processed radar signal; and output the processed radar signal or the information on the object to the controller, and wherein the controller is configured to: receive the radar signal processed by the signal processor, thereby generating the information on the object; based on the generated information on the object and the information on the object received from the signal processor, when the object is duplicately detected, integrate multiple pieces of information on the object into one; and when the object moves from the field of sensing of the first radar sensor to the field of sensing of the second radar sensor, perform control so as to hand over the information on the object.

11. A radar apparatus for a vehicle, the apparatus comprising:
   a plurality of radar sensors disposed at the vehicle and configured to capture sensing data, each radar sensor having a field of sensing of a surrounding around the vehicle; and
   at least one processor configured to process the sensing data captured by the plurality of radar sensors, and control at least one driver assistance system for the vehicle,
   wherein two or more radar sensors' fields of sensing of the surrounding are partially overlapped with each other, and the processor is configured to, responsive at least in part to processing by the processor of the sensing data, when the two or more radar sensors duplicately detects the object at the overlapped field of the two or more radar sensors, select sensing data of one radar sensor, which has detected the object before the two or more radar sensors duplicately detect the object at the overlapped field of the two or more radar sensors, among the sensing data of the one radar sensor which has detected the object first before the two or more radar sensors duplicately detect the object and sensing data of an other radar sensor which detects the object later after the two or more radar sensors duplicately detect the object, and perform control the at least one driver assistance system based on the selected sensing data of the one radar sensor for the overlapped field of the two or more radar sensors.

12. The apparatus of claim 11, wherein the processor is configured to compare the two or more pieces of information on the objects detected by the two or more radar sensors with each other, thereby determining whether or not the detected objects are the same, and is configured to determine that the object has been duplicately detected if the detected objects are the same.

13. The apparatus of claim 11, wherein the processor is configured to, when the object moves from the field of sensing of the first radar sensor to the field of sensing of the second radar sensor, continuously track the object in the field of sensing of the second radar sensor using the information on the object detected by the first radar sensor.

14. The apparatus of claim 13, wherein the processor is configured to calculate a predicted position of the object in the field of sensing of the second radar sensor based on the information on the object detected by the first radar sensor, and is configured to, if the position of the object detected by the second radar sensor is the same as the predicted position, hand over the information on the object from the first radar sensor to the second radar sensor.

15. The apparatus of claim 11, wherein the processor is configured to, when a plurality of objects are provided, assign a unique identification number (ID) to each object and is configured to perform control so as to hand over the identification number.

16. The apparatus of claim 11, wherein each of the plurality of radar sensors comprises:
an antenna;
a transmitter configured to generate a radar signal and configured to transmit the same through the antenna;
a receiver configured to receive a radar signal reflected by the object through the antenna; and
a signal processor configured to process the received radar signal.

17. The apparatus of claim 16, wherein the processor is configured to: receive radar signals processed by the respective signal processors of the plurality of radar sensors, thereby generating the information on the object; when the object is duplicately detected, integrate multiple pieces of information on the object into one; and when the object moves from the field of sensing of the first radar sensor to the field of sensing of the second radar sensor, perform control so as to hand over the information on the object.

18. The apparatus of claim 16, wherein the signal processor included in each of the plurality of radar sensors is configured to process the received radar signal, thereby generating the information on the object, and is configured to output the information on the object to the processor, and
wherein the processor based on the information on the object received from the signal processor, is configured to, when the object is duplicately detected, integrate the information on the object into one, and is configured to, when the object moves from the field of sensing of the first radar sensor to the field of sensing of the second radar sensor, perform control so as to hand over the information on the object.

19. The apparatus of claim 16, wherein the signal processor included in each of the plurality of radar sensors is configured to: process the received radar signal; generate the information on the object from the processed radar signal; and output the processed radar signal or the information on the object to the processor, and
wherein the processor is configured to: receive the radar signal processed by the signal processor, thereby generating the information on the object; based on the generated information on the object and the information on the object received from the signal processor, when the object is duplicately detected, integrate multiple pieces of information on the objects into one; and when the object moves from the field of sensing of the first radar sensor to the field of sensing of the second radar sensor, perform control so as to hand over the information on the object.

20. A method of controlling a radar apparatus for a vehicle equipped with a plurality of radar sensors, each having a field of sensing, the method comprising:
generating information on an object based on a radar signal reflected by the object entering fields of sensing of the plurality of radar sensors, wherein two or more radar sensors' fields are partially overlapped with each other; and
when the two or more radar sensors duplicately detect the object at the overlapped field of the two or more radar sensors, selecting sensing data of one radar sensor, which has detected the object before the two or more radar sensors duplicately detect the object at the overlapped field of the two or more radar sensors, among the sensing data of the one radar sensor which has detected the object first before the two or more radar sensors duplicatedly detect the object and sensing data of an other radar sensor which detect the object later after the two or more radar sensors duplicatedly detect the object, and performing control of the vehicle based on the selected sensing data of the one radar sensor for the overlapped field of the two or more radar sensors.

* * * * *